United States Patent [19]

Morris et al.

[11] Patent Number: 5,329,858
[45] Date of Patent: Jul. 19, 1994

[54] UNIVERSAL TELESCOPING BULKHEAD DOOR TROLLEY ASSEMBLY

[75] Inventors: Thomas G. Morris, Littleton; Laurence J. Artelli, Parker, both of Colo.

[73] Assignee: Joseph T. Ryerson & Son, Inc., Chicago, Ill.

[21] Appl. No.: 31,655

[22] Filed: Mar. 15, 1993

[51] Int. Cl.⁵ .............................................. B60P 7/00
[52] U.S. Cl. .................................. 105/178; 410/130
[58] Field of Search ............. 410/121, 126, 130, 131, 410/132, 133, 134, 135, 136, 137, 138, 139, 150; 105/178; 52/243.1

[56] References Cited

U.S. PATENT DOCUMENTS

| 986,810 | 3/1911 | Dixey | 410/135 |
|---|---|---|---|
| 1,825,452 | 9/1931 | Harris | 410/137 |
| 2,004,676 | 6/1935 | Seitter | 105/178 |
| 3,352,257 | 11/1967 | Lehnert et al. | 410/134 |
| 3,376,599 | 4/1968 | Singer | 410/130 |
| 3,808,982 | 5/1974 | Bertram et al. | 410/139 |
| 4,372,716 | 2/1983 | Blout | 410/134 |
| 4,502,619 | 3/1985 | Cox | 410/121 |

Primary Examiner—Mark T. Le
Attorney, Agent, or Firm—Marshall, O'Toole, Gerstein, Murray & Borun

[57] ABSTRACT

A trolley assembly for mounting a movable bulkhead door within a rail car. The trolley assembly includes a plurality of frame members that are telescopically interconnected and longitudinally adjustable with respect to each other so that the frame members can be secured together to provide a trolley apparatus that spans pairs of overhead, internal rail car tracks having different lateral spacings. The ends of the trolley assembly each include a plurality of trolley wheels for rotation along the rail car tracks, for movement of the trolley assembly longitudinally within the rail car and to carry a bulkhead door over the length of the rail car interior.

15 Claims, 4 Drawing Sheets

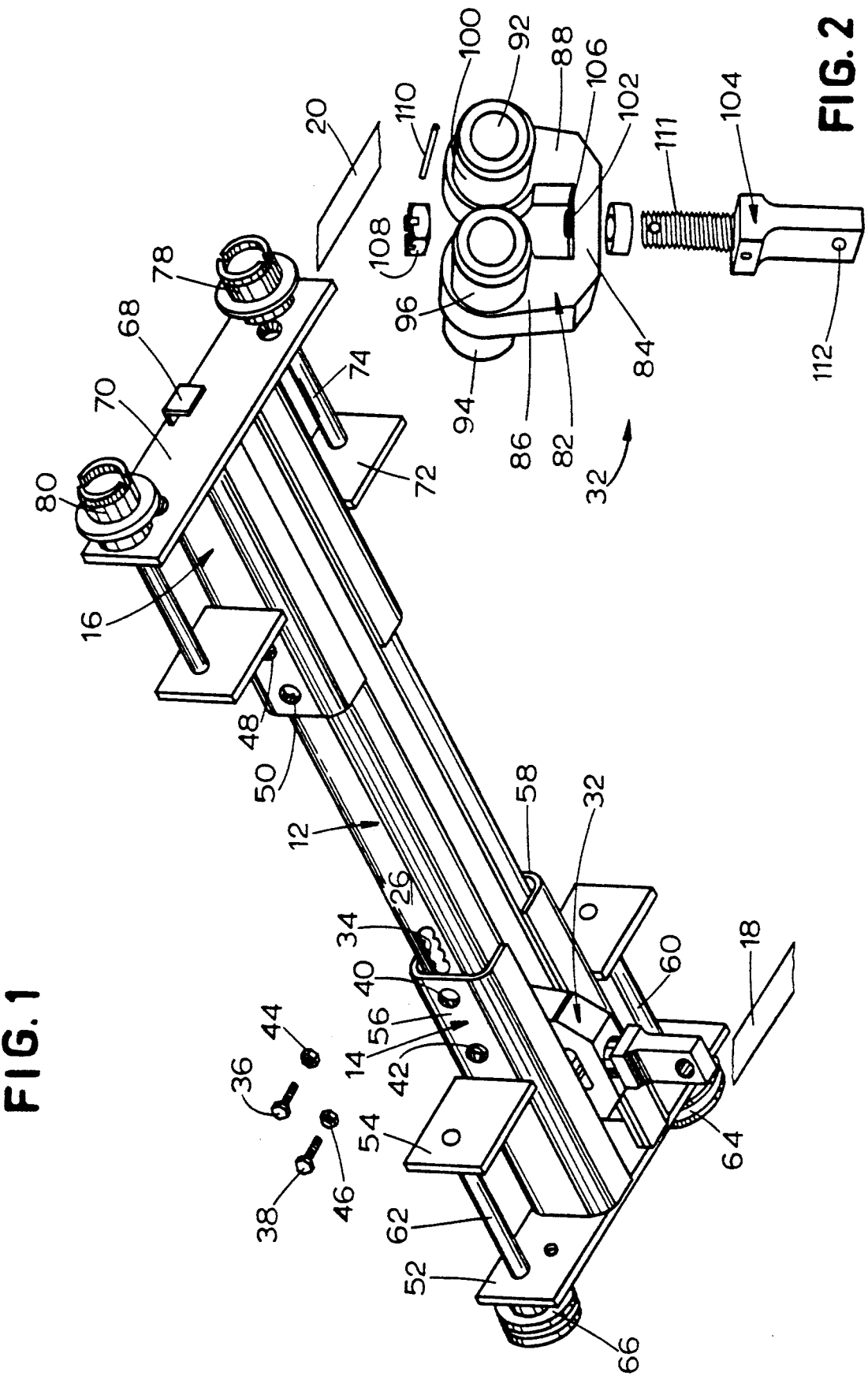

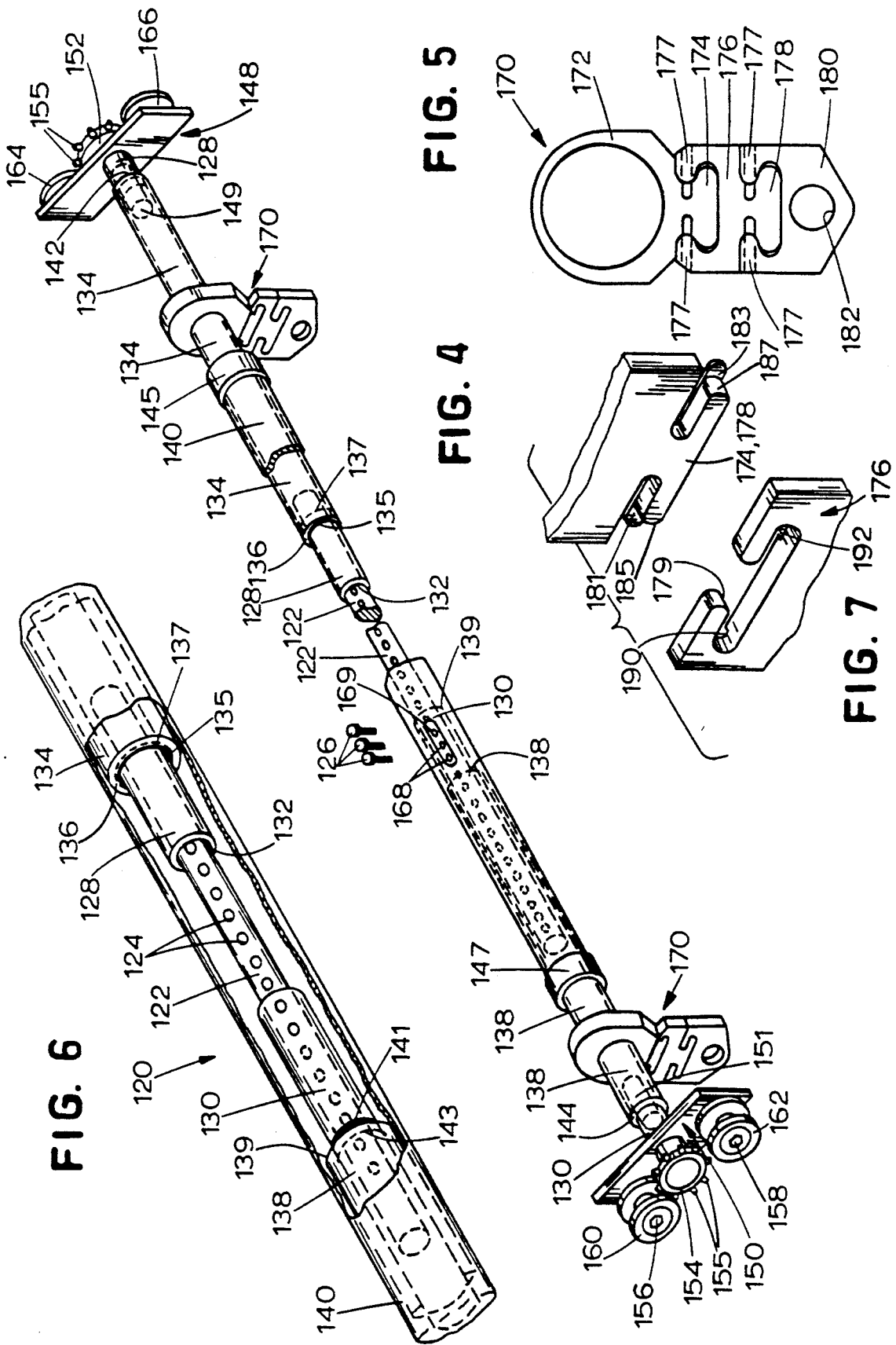

UNIVERSAL TELESCOPING BULKHEAD DOOR TROLLEY ASSEMBLY

FIELD OF THE INVENTION

The present invention is directed to a trolley apparatus, and method, that is capable of longitudinal adjustment to different lengths to span a plurality of spacings between pairs of overhead rail car tracks within a rail car for carrying a bulkhead door that is movable with the trolley along the overhead, internal rail car tracks. More particularly, the present invention is directed to a telescoping trolley apparatus that can be adjusted readily to accommodate different spacings between differently spaced and configured overhead, internal rail car tracks, for movably carrying bulkhead doors of different dimensions. The trolley apparatus includes a plurality of wheels that are readily replaceable with wheels of a different configurations for movement of the trolley over differently configured rail car tracks, for confining and separating a defined volume of space or cargo from other space or materials within the rail car.

BACKGROUND OF THE INVENTION AND PRIOR ART

Trolley assemblies, capable of longitudinal movement within a rail car, that carry a bulkhead door for confining and separating cargo within the rail car are known in the art. One of the problems associated with bulkhead door-carrying trolley assemblies used within rail road cars is that different rail road cars commonly include trolley-supporting, overhead, internal rail car tracks having different spacings between rails in a pair of rails and different rail cross-sectional configurations and, therefore, a number of different, distinct trolley assemblies having different lengths and different wheel configurations presently are needed to accommodate the different rail car tracks.

Accordingly, there has been a long-felt need in the rail road industry to provide a universal trolley assembly that is useful over a variety of differently spaced and differently configured, trolley-supporting, overhead, internal rail car tracks wherein the trolley assembly is readily adjustable to accommodate the different spacings and different track configurations so that the trolley assembly can be readily modified to take into account these different rail car tracks.

SUMMARY OF THE INVENTION

The drawbacks and deficiencies of prior art trolley assemblies capable of carrying bulkhead doors for use in separating cargo in a rail car are eliminated by an apparatus and method in accordance with the present invention.

The universal trolley assembly of the present invention is capable of longitudinal adjustment to different lengths to span a plurality of different spacings of overhead, internal rail car tracks and the rail car track-contacting trolley wheels can be exchanged readily with differently configured wheels to accommodate the different cross-sectional configurations of existing rail car tracks.

The trolley assembly of the present invention generally includes a plurality of telescoping frame members that are telescopically interconnected and longitudinally adjustable with respect to each other so that the frame members can be secured together to provide a trolley apparatus that spans overhead, internal rail car tracks having different spacings. The ends of the trolley assembly each include a plurality of trolley wheels for rotation along the rail car tracks for movement of the trolley assembly longitudinally within the rail car and to carry a bulkhead door across the length of the rail car interior. In one embodiment, the trolley assembly frame members are generally rectangular in configuration and include spaced trolley frame roller supporting structures that are longitudinally disposed within an interior of the trolley assembly.

A bulkhead door hanger bracket secures the bulkhead door to the trolley assembly. In a preferred embodiment, the hanger bracket is capable of rotation such that the bulkhead door can be either longitudinally aligned with the trolley assembly or disposed transverse to the trolley assembly. In another embodiment, the trolley frame members comprise inner and outer concentric cylinders, and an outer surface of the outer frame member supports a plurality of spaced hanger brackets that are, preferably, modular in construction to provide different overall trolley frame lengths.

Accordingly, one aspect of the present invention is to provide a universal trolley assembly, longitudinally movable over a pair of spaced, overhead, internal rail car trolley-supporting tracks, disposed in an upper portion of an interior of a rail car. The trolley is adjustable in length to accommodate different spacings of different rail car tracks, within the interior of the railroad car.

Another aspect of the present invention is to provide a trolley apparatus, for carrying either a single width (two piece) or double (full) width bulkhead door within a railroad car, that is modular in construction. The apparatus includes trolley wheels which can be readily exchanged for trolley wheels of a different configuration for rolling engagement over internal rail car tracks of various configurations.

Another aspect of the present invention is to provide a trolley apparatus including one or more door connecting mechanisms attached to the trolley apparatus for connecting a bulkhead door to the trolley apparatus. The door connecting mechanism is readily adjustable in length for supporting a bulkhead door, either single width (two piece) or double (full) width, each hanging downwardly from the door connecting mechanism, above a floor of the rail car.

BRIEF DESCRIPTION OF THE DRAWINGS

Other features and advantages are inherent in the method and apparatus of the present invention or will become apparent to those skilled in the art from the following detailed description in conjunction with the accompanying drawings; wherein:

FIG. 1 is a perspective view of one embodiment of the trolley assembly apparatus constructed in accordance with the principles of the present invention;

FIG. 2 is a partially exploded, perspective view of a door connecting mechanism portion of the apparatus of FIGS. 1 and 3;

FIG. 4 is a perspective view of another embodiment of the trolley assembly apparatus constructed in accordance with the principles of the present invention;

FIG. 5 is a perspective view of a modular door connecting mechanism portion of the apparatus of FIG. 4;

FIG. 6 is a broken-away view of the central, telescoping portion of the apparatus of FIG. 4;

FIG. 7 is a broken-away, perspective view of interfitting portions of the modular door connecting mechanism of FIG. 5.

DETAILED DESCRIPTION OF THE PREFERRED EMBODIMENTS

Figure 3:
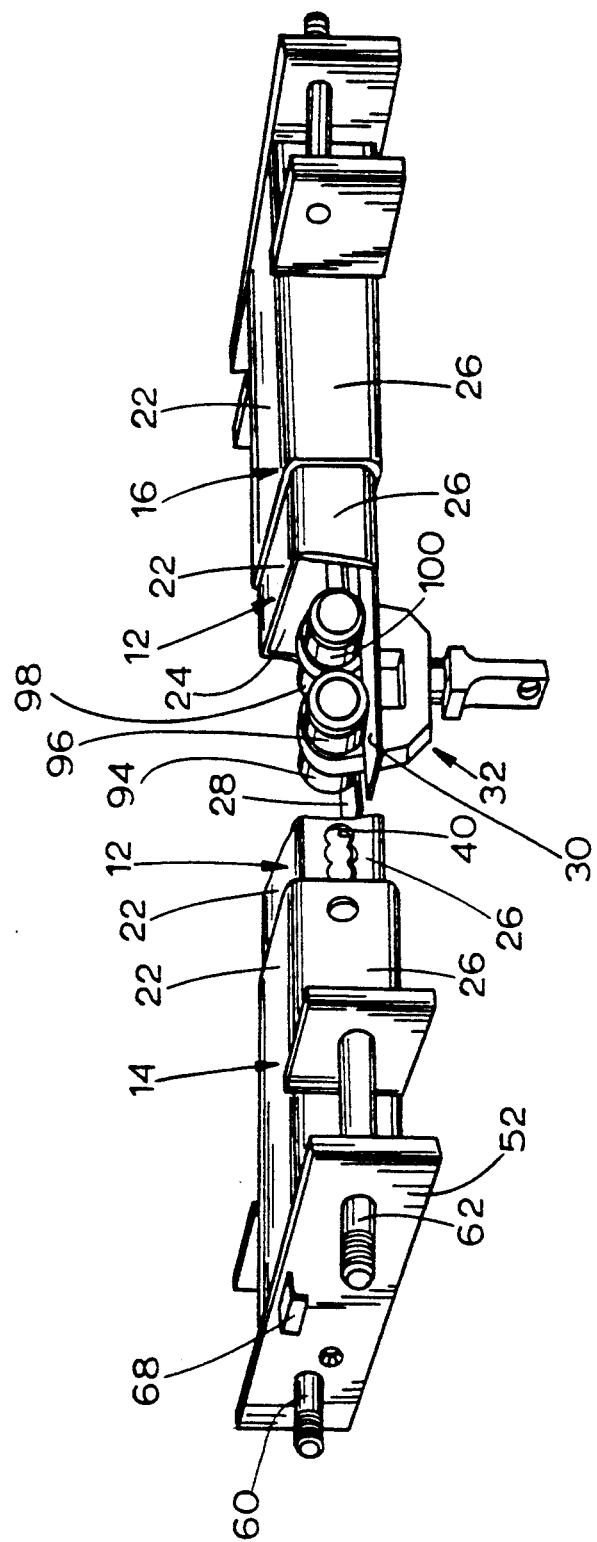
FIG. 3 is a partially broken-away perspective view of the trolley assembly of FIG. 1.

Turning now to the drawings, and initially to FIGS. 1-3, there is shown one embodiment of a new and improved modular and universal trolley assembly generally designated by reference numeral 10. The two piece trolley assembly shown in FIGS. 1-3 is preferred for movably supporting a bulkhead door 11, shown in FIG. 8, that spans one half of the width of a rail car interior, so that another identical trolley assembly will be positioned adjacent thereto, supporting another, identical bulkhead door. The two, adjacent is bulkhead doors, thereby, will span the entire width of the rail car 13, and each door can move longitudinally and independently within the rail car. An example of a bulkhead door that is carried by the trolley assembly of the present invention is shown in U.S. patent application Ser. No. 07/947,513, filed Sep. 17, 1992, the disclosure of which is hereby incorporated by reference.

Figure 8:
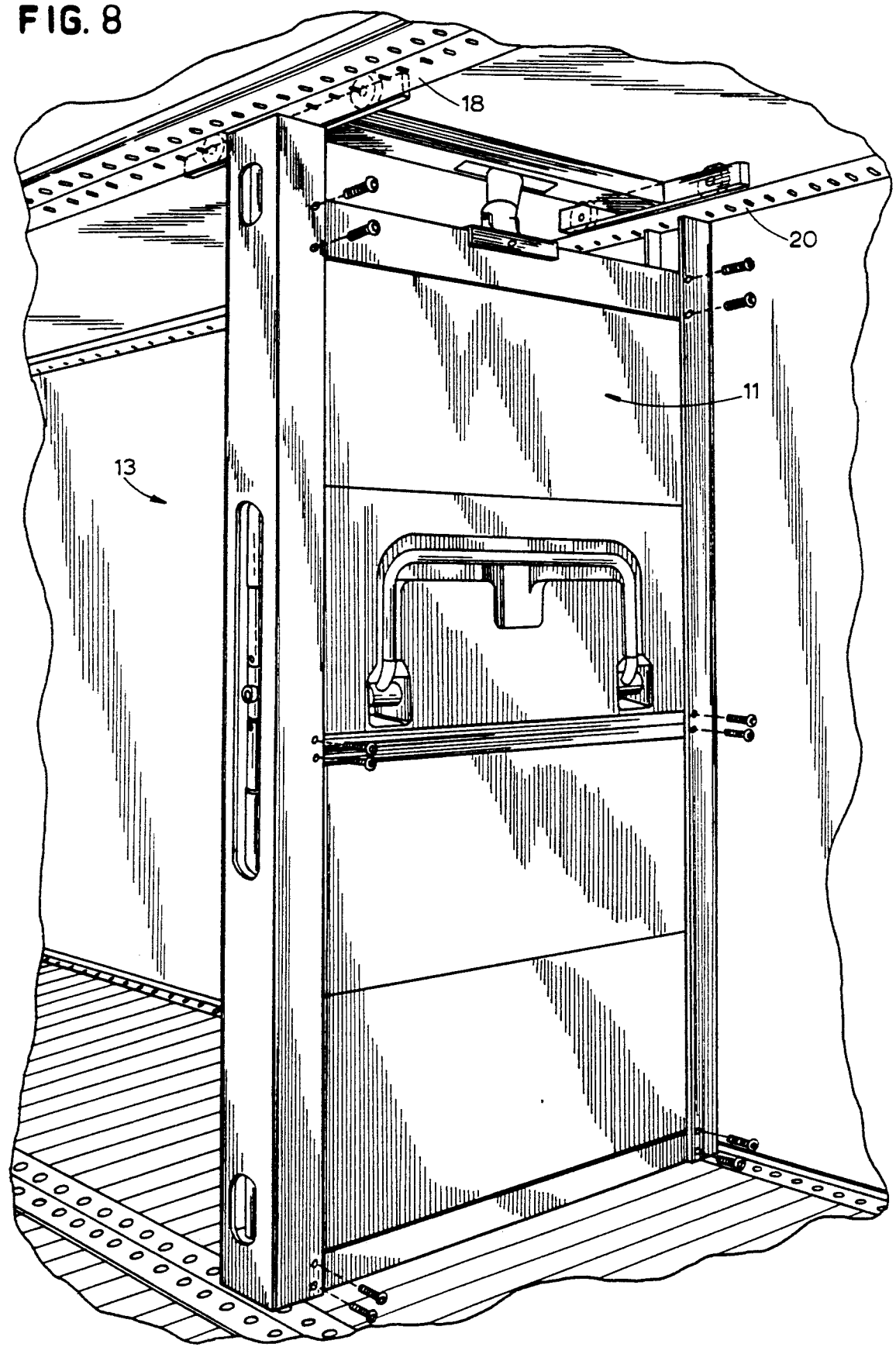
FIG. 8 is a perspective view showing a bulkhead door supported on a trolley assembly between internal rails within a railroad car.

The trolley assembly 10, in accordance with the embodiment shown in FIGS. 1-3, includes a central rectangular frame member 12 that fits closely and slidingly within a pair of end rectangular frame members, generally designated by reference numerals 14 and 16. These telescoping frame members provide a trolley that is longitudinally adjustable to different lengths to span a plurality of interior spacings of parallel, overhead, internal rail car tracks 18 and 20 (FIGS. 1 and 8).

As best shown in FIGS. 1 and 3, each of the frame members 12, 14 and 16 has a generally inverted U-shaped cross-section and includes an upper frame base portion 22 (FIG. 3) and two integral, downwardly extending L-shaped frame portions including elongate leg portions 24 and 26, and elongate foot portions 28 and 30 that are integral with and extend horizontally inwardly at right angles from the leg portions 24 and 26, respectively. The foot portions 28 and 30 form inwardly extending roller supporting structures for supporting rollers 94, 96, 98 and 100 of a moveable door connecting mechanism, generally designated by reference numeral 32 (FIG. 2). In the preferred embodiment all three frame members 12, 14 and 16 include inwardly extending roller supporting structures 28 and 30 for solid support of a bulkhead door via rollers 94, 96, 98 and 100. The door connecting mechanism 32 connects the trolley assembly 10, through a door hanger bracket (not shown) to a bulkhead door.

As best shown in FIG. 1, trolley end frame member 14 is formed in the same generally rectangular, cross-sectional configuration as central frame member 12 and is slightly larger so that end frame member 14 can telescope over, and is readily removed from, the central frame member 12. The end frame member 14 can be secured to the central frame member 12 at a number of longitudinal positions represented by adjacent, aligned apertures 34 in leg member 26 of U-shaped central frame member 12. Bolts 36 and 38 fit through apertures 40 and 42, respectively, in the side 43 of end frame member 14, and pass through a desired aperture 34 in the side of central frame member 12. Lock nuts 44 and 46 are locked in place surrounding the bolts 36 and 38 within the interior of the central frame member 12 to maintain the end frame member 14 in a desired longitudinal position, telescoped over the outer surfaces of the central frame member 12. An opposite side of end frame member 14 also includes apertures that can be aligned with apertures in the opposite leg member 24 of central frame member 12 for bolting the end frame member 14 to central frame member 12 from both sides. The trolley assembly 10, thereby can be set at a desired length corresponding to a given spacing between the rail car tracks 18 and 20, secured within an upper portion of the inside of the rail car.

End frame member 16, similarly, could be adjusted longitudinally with respect to central frame member 12 but, since only about a 6 inch differential in length adjustment is required for the trolley assembly 10 to accommodate various, different spacings between rail car tracks 18 and 20 in all existing rail cars, the end frame member 16 can be welded to the outer periphery of central frame member 12, or permanently bolted thereto through apertures 48 and 50.

As best shown in FIG. 1, the end frame member 14 includes an integral outer plate member 52 and a parallel, integral inner plate member 54, each extending horizontally and outwardly from the side or leg surfaces 56 and 58 of end frame member 14. These spaced, parallel and horizontally aligned plates 52 and 54 provide support for spaced axles 60 and 62 for supporting a pair of spaced rollers or wheels 64 and 66 that extend outwardly from end plate 52 for contact and rotation over rail car track 18 during movement of the trolley assembly 10 longitudinally within the rail car. In a preferred embodiment, end plate 52 includes one or more safety brackets 68, extending perpendicularly outwardly from end plate 52 (FIG. 3). In the event that wheels 64 or 66 should break or fall away from the rail car track 18, safety bracket 68 will engage the rail car track 18 and prevent the trolley assembly 10, and the bulkhead door, from falling downwardly.

As best shown in FIG. 1, axles 60 and 62 are journaled horizontally through plates 52 and 54 and are disposed horizontally to extend outwardly from end plate 52 so that the wheels 64 and 66 are aligned above rail car track 18 to permit the wheels 64 and 66 to roll back and forth in alignment over the rail car track 18. Similarly, end frame member 16 includes an outer steel plate member 70 and an inner steel plate member 72 that are spaced and disposed parallel to each other for receiving and supporting journaled axles 74 and 76 that support opposite trolley wheels 78 and 80. The wheels 78 and 80 extend outwardly from end plate 70 on end frame member 16 to support the other end of the trolley assembly 10 over the other rail car track 20.

Turning now to FIGS. 2 and 3, in accordance with an important feature of one embodiment of the present invention, the door connecting mechanism 32 includes a generally U-shaped bracket member, generally designated by reference numeral 82. Bracket member 82 includes a bracket base member 84 and a pair of integral, upstanding bracket leg members 86 and 88. Each bracket leg member 86 and 88 mounts a horizontally disposed axle 90 and 92, respectively, received perpendicularly through the leg members 86 and 88. Axles 90 and 92 each support a pair of wheels or rollers 94, 96 and 98, 100, respectively, for rolling contact on the trolley rails 28 and 30, respectively.

Connecting mechanism base member 84 includes an aperture 102 that receives a bulkhead door-securing, pin-receiving member, generally designated by reference numeral 104. Member 104 is secured to an upper surface 106 of connecting mechanism base member 84, with a lock nut 108 threadedly secured to an upper end of threaded bolt 111 integral with base member 84, and pin 110. Pin-receiving member 104 includes a lower aperture 112 adapted to receive an attaching pin (not shown) for securing a bulkhead door hanger bracket thereto. Threaded bolt 111 can freely rotate within aperture 102 to permit rotation of the bulkhead door to a disposition perpendicular to the trolley longitudinal axis upon release of bulkhead door latch pins, for easy access behind the bulkhead door.

Another important embodiment of the present invention, shown in FIGS. 4 and 6, is a cylindrically shaped, modular and universal trolley assembly, generally designated 120. The cylindrical trolley assembly 120 withstands a vertical force of 11,000 pounds that is five times the weight of a double wide steel bulkhead door, having a weight of 2,200 pounds, and provides sufficient strength to support a double width bulkhead door that can span essentially an entire interior width of a rail car.

Trolley assembly 120 includes an innermost frame member 122, formed from a solid steel cylindrical rod 122, having a plurality of apertures 124 adapted to receive one or more bolts 126. Cylindrical rod 122 is concentrically received at its ends within surrounding annular steel frame members 128 and 130. Innermost cylindrical rod 122 is rigidly secured to annular tube 128, such as by welding at interface 132, and rod 122 is telescopically received within, and axially moveable with respect to, annular tube 130 for telescopically lengthening and shortening the trolley assembly 120 to accommodate different spacings between rail car tracks in a rail car, as previously described with reference to FIGS. 1-3.

Annular frame member 128 is concentrically and rotatably received within an outer annular steel frame member 134. Annular bushings 135 and 137 received in slots disposed within frame member 128 and on opposite sides of a distal end 136 of frame member 134 fix the longitudinal disposition of frame members 128 and 134 while allowing rotation of frame member 128 with respect to frame member 134. Similarly, annular frame member 130 is concentrically received within another annular steel frame member 138. Annular bushings 141 and 143, like bushings 135 and 137, are received in slots within slots in frame member 130 and are disposed on opposite sides of a distal end 139 of frame member 138 to fix the longitudinal relationship of frame member 130 with respect to frame member 138 while allowing rotation of frame member 130 with respect to frame member 138.

Rotation of adjacent annular frame members with respect to each other permits the adjacent frame members to avoid excessive structural stress during rail car coupling and during movement of the trolley assembly within the interior of the rail car. Annular frame members 134 and 138 are concentrically and rotatably received within an outer annular frame member 140 that includes collars 145 and 147 at the ends of frame member 140 to reinforce or strengthen the trolley assembly 120.

In the preferred embodiment, the outermost frame member 140 is 66.25 inches long between distal ends of collars 145 and 147 and an outer diameter (O.D.) of 30 inches; frame members 134 and 138 are each 35 inches long and 2.5 inch O.D.; frame members 128 and 130 are each 46 inches long and 1.5 inch O.D.; and solid steel frame member 122 is 39.375 inches long and 1.0 inch O.D. For further strengthening near the rail-contacting ends of trolley 120, 6 inch long solid steel bars, 149 and 151 are disposed within the ends of annular frame members 128 and 130, respectively, and centered under the distal ends 142 and 144 of frame members 134 and 138, respectively. Solid bars 149 and 151 are maintained in their longitudinal positions, centered under ends 142 and 144 of frame members 134 and 138, respectively, by bushings or bearings (not shown) disposed to longitudinally fix the solid bars or rods 149 and 151 while permitting relative rotational movement of frame members 134 and 138 with respect to bars 149 and 151, respectively.

The annular cylindrical frame members 134 and 138 are rotatably interconnected to wheel-supporting steel end plates, generally designated 148 and 150, respectively. The steel end plates 148 and 150 extend radially outwardly from frame members 128 and 130 for rotatably supporting rail car track-contacting rollers or wheels 152 and 154, respectively, for longitudinal movement of the trolley assembly 120 over the length of the rail car. Wheels 152 and 154, shown in FIG. 4, include spaced sprockets 155 that fit within correspondingly spaced apertures in some rail car tracks 18 and 20. These wheels 152 and 154 can be readily replaced with wheels of other configurations, e.g., that do not have sprockets 155, for movement over tracks that do not include spaced apertures.

End plate 150 includes two additional outwardly extending axles 156 and 158, rigidly fixed to end plate 150, that support rotatable rollers or wheels 160 and 162, respectively, that can engage the rail car track 18, to achieve easier longitudinal movement of the trolley assembly 120 over the rail car track 18. Similarly, end plate 148 includes two additional outwardly extending axles (not shown), rigidly fixed to end plate 148, that support rotatable rollers or wheels 164 and 166, respectively, that can engage the other spaced rail car track 20, to achieve easier longitudinal movement of the trolley assembly 120 over the rail car track 20.

As best shown in FIG. 4 and 6, in the preferred embodiment, inner solid steel cylindrical frame member 122 is fixed to annular cylindrical frame member 128, e.g., by welding at their interface, 132. Inner solid steel cylindrical frame member 122 is free to move longitudinally within annular cylindrical frame member 130 to change the distance between rail car track-contacting rollers or wheels 152 and 154. The apertures 124 extending through the inner telescoping solid cylindrical frame member 122 are aligned with apertures 168 extending through an outer wall of annular cylindrical frame member 130. Access opening 169 extends through outer frame member 140 for securing and releasing the bolts 126 for length adjustment of the trolley 120. The bolts 126 are inserted through the aligned apertures 124 and 168 to set the length of the trolley assembly to fit the span between rail car tracks 18 and 20 in any given rail car. Similar to the embodiment shown in FIGS. 1-3, rollers or wheels 152 and 154 can be removed readily and replaced with wheels having a different configuration to accommodate different configurations of rail car tracks 18 and 20 encountered in various railroad cars.

In accordance with another important feature of the FIG. 4 embodiment of the present invention, a pair of spaced door connecting mechanisms, generally designated 170 (shown in more detail in FIGS. 5 and 7), are secured at spaced locations surrounding the frame members 134 and 138 to support a double width bulkhead door (not shown). The bulkhead door, aligned with trolley 120, spans essentially an entire width, e.g., nine feet, across the interior of a rail car. Each door connecting mechanism 170 includes an upper annular ring or collar portion 172, dimensioned to surround the outer periphery of frame members 134 and 138, and a horizontal elongate leg member 174, integral with the annular ring portion 172. One or more generaully U-shaped bracket-lengthening interfitting segments 176, each having an open end 179 facing upwardly toward the leg member 174, and cooperatively shaped to receive and surround the leg member 174 or 178. Leg members 174 and 178 each have integral extending tongue portions 181 and 183 extending horizontally outwardly from distal ends 185 and 187, respectively, of leg members 174 and 178 that fit within cooperatively shaped grooves 190 and 192 in one face of bracket segments 176 and 180, respectively, for more secure attachment of adjacent segments.

Each integral, horizontal leg member 174 and 178 is configured to correspond to the configuration of the open end 179 of an adjacent segment for strong interconnection. Accordingly, any number of bracket segments 176 can be fitted together, as shown in FIG. 5, to raise or lower a lowermost surface of the bulkhead doors appropriately to provide a desired spacing between the bulkhead door and a floor of the rail car. Set screws 177 secure each U-shaped segment 176 to each adjacent leg member 178. A lowest segment 180 of each hanger bracket 170 is formed with a C-shaped open upper surface, for interfitting to surround segment leg member 178, and includes an aperture 182 for interconnection to the bulkhead door.

Numerous modifications and alternative embodiments of the present invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A trolley apparatus capable of longitudinal adjustment to different lengths to span a plurality of interior spacings of parallel rail car tracks within an upper interior of a rial car, and capable of carrying a bulkhead door between differently spaced rail car tracks, said apparatus comprising:
   a first, innermost cylindrical frame member;
   a second frame member concentrically received over and readily removable from said first frame member, at one end of said first frame member;
   a third frame member received over another end of said first frame member;
   means mounting said second frame member for longitudinally adjustment with respect to said first frame member, such that said second frame member can be longitudinally adjusted and secured, at different positions relative to said first frame member, to span a plurality of rail car track spacings;
   said second and third frame members carrying a plurality of trolley wheels capable of rotating along said rail car tracks for movement of said frame members in a direction transverse to their longitudinal axes; and
   door connecting means removably connected to one of said frame members for suspending a bulkhead door downwardly from said frame member.

2. The trolley apparatus of claim 1, further including means for removing and replacing said wheels with wheels adapted for rotation over rail car tracks of a different cross-sectional configuration.

3. The trolley apparatus of claim 1, wherein each outermost longitudinal end of said second and third frame members of said trolley apparatus carries a plurality of rotatable wheels adapted to rotate over one of said spaced rail car tracks.

4. The trolley apparatus of claim 1, wherein: the first frame member including a plurality of apertures for alignment with apertures in one of the second and third frame members; and means for securing the first frame member and said one of the second and third frame members together at the aligned apertures.

5. The trolley apparatus of claim 4, wherein said door connecting means comprises an annular ring for encircling an outer periphery of said one of said frame members; and means for attaching a bulkhead door to a lower portion of said ring.

6. The trolley apparatus of claim 5, wherein said annular ring includes a plurality of segments that fit together for lengthening said annular ring without separating the annular ring from said one of said frame members.

7. A method of confining goods in a rail car to prevent the goods from moving beyond a plane within said rail car, comprising:
   suspending a bulkhead door from a trolley assembly such that one planar surface of said bulkhead door is aligned with said plane;
   said trolley assembly including wheels in alignment with, and capable of rotation over, spaced, parallel, overhead rail car tracks disposed within said rail car;
   said trolley assembly including:
   a first, innermost cylindrical frame member;
   a second frame member concentrically received over and readily movable from said first frame member, at one end of said first frame member;
   a third frame member received over another end of said first frame member;
   means mounting said second frame member for longitudinal adjustment with respect to said first frame member, such that said second frame member can be longitudinally adjusted and secured, at different positions relative to said first frame member, to span a plurality of rail car track spacings;
   said second and third frame members carrying said trolley wheels aligned above said rail car tracks for movement of said frame members in a direction transverse to their longitudinal axes; and
   door connecting means removably connected to one of said frame members for suspending said bulkhead door downwardly from said frame member.

8. A method of installing a trolley assembly within a rail car for supporting a bulkhead door for movement along overhead, internal, spaced, parallel rail car tracks, comprising:

measuring a distance between said spaced rail car tracks;

telescoping a first, wheel-carrying outer frame member of said trolley assembly over an innermost, cylindrical frame member that is secured to a second, wheel-carrying outer frame member such that an overall length between trolley wheels, disposed on opposite longitudinal ends of said two outer trolley assembly frame members, is about equal to said distance between said rail car tracks;

securing said first outer frame member to said innermost, cylindrical frame member to fix said trolley length to correspond to said rail track spacing; and disposing said trolley assembly within said rail car such that said trolley wheels are disposed above and in engagement with upper surfaces of said rail car tracks.

9. A trolley apparatus capable of longitudinal adjustment to different lengths to span a plurality of interior spacings of parallel rail car tracks within an upper interior of a rail car, and capable of carrying a bulkhead door between differently spaced rail car tracks, said apparatus comprising:

an interior first frame member;

a second frame member rigidly connected to and concentrically receiving one end of said first frame member;

a third frame member longitudinal moveable with respect to another end of said first frame member and disposed to concentrically receive said another end of said first frame member;

means mounting said third frame member for longitudinally adjustment with respect to said first frame member, such that said third frame member can be longitudinally adjusted and secured, at different positions relative to said first frame member, to span a plurality of rail car track spacings;

cylindrical frame means disposed to concentrically receive said first, second and third frame members and structurally reinforce said first, second and third frame members;

said frame members carrying a plurality of trolley wheels capable of rotating along said rail car tracks for movement of said frame members in a direction transverse to their longitudinal axes; and door connecting means removably connected to one of said frame members for suspending a bulkhead door downwardly from said frame member.

10. The trolley apparatus of claim 9, wherein said cylindrical frame means comprises a fourth frame member disposed concentrically about a portion of said first frame member and said second frame member, and a fifth frame member disposed concentrically about another portion of said first frame member and said third frame member.

11. The trolley apparatus of claim 10 further including a sixth cylindrical annular frame member disposed concentrically about said first, second, third, fourth and fifth frame members.

12. The trolley apparatus of claim 10, wherein said fourth frame member is longitudinally fixed and rotatable with respect to said second frame member and said fifth frame member is longitudinally fixed and rotatable with respect to said third frame member.

13. The trolley apparatus of claim 11, wherein said sixth frame member is disposed concentrically over said fourth and fifth frame members and longitudinally fixed and rotatable with respect to said fourth and fifth frame members.

14. The trolley apparatus of claim 9, wherein said wheels includes means to allow said wheels to be readily removable and replaceable with wheels adapted for rotation over rail car tracks of a different cross-sectional configuration.

15. The trolley apparatus of claim 9, wherein the trolley apparatus includes two longitudinal ends, each carrying a plurality of rotatable wheels adapted to rotate over one of said spaced rail car tracks.

* * * * *

UNITED STATES PATENT AND TRADEMARK OFFICE
CERTIFICATE OF CORRECTION

PATENT NO. : 5,329,858
DATED : JULY 19, 1994
INVENTORS : MORRIS, ET AL.

It is certified that error appears in the above-identified patent and that said Letters Patent is hereby corrected as shown below:

Column 7, line 56, after "a" delete "rial" and substitute therefor -- rail --;

Signed and Sealed this

Third Day of January, 1995

Attest:

BRUCE LEHMAN

*Attesting Officer*     *Commissioner of Patents and Trademarks*